US012620325B2

(12) United States Patent
Stump

(10) Patent No.: US 12,620,325 B2
(45) Date of Patent: May 5, 2026

(54) LYMPHATIC SYSTEM SIMULATOR

(71) Applicant: Melissa Stump, Dublin, VA (US)

(72) Inventor: Melissa Stump, Dublin, VA (US)

( * ) Notice: Subject to any disclaimer, the term of this patent is extended or adjusted under 35 U.S.C. 154(b) by 0 days.

(21) Appl. No.: 18/806,488

(22) Filed: Aug. 15, 2024

(65) Prior Publication Data

US 2025/0124818 A1      Apr. 17, 2025

Related U.S. Application Data

(60) Provisional application No. 63/534,198, filed on Aug. 23, 2023.

(51) Int. Cl.
G09B 23/30      (2006.01)
G09B 9/00      (2006.01)

(52) U.S. Cl.
CPC ............. G09B 23/303 (2013.01); G09B 9/00 (2013.01)

(58) Field of Classification Search
CPC ........ G09B 23/30; G09B 23/303; G09B 9/00; G09B 23/28
See application file for complete search history.

(56) References Cited

U.S. PATENT DOCUMENTS

2016/0314718 A1* 10/2016 Bergs ..................... G09B 23/32
2019/0380792 A1* 12/2019 Poltaretskyi ............ G06F 3/011
2021/0295741 A1*  9/2021 Bluemler ........... C11D 17/0095
2021/0327305 A1* 10/2021 Haase .................... G09B 23/34

OTHER PUBLICATIONS

Melissa Stump, demonstration model from the Virginia Tech BioMedical Senior Expo, photograph taken Apr. 20, 2023.

* cited by examiner

*Primary Examiner* — Timothy A Musselman
(74) *Attorney, Agent, or Firm* — MUNCY, GEISSLER, OLDS & LOWE, P.C.

(57)      ABSTRACT
A simulation system for hands-on training for medical diagnostic and treatment techniques is provided. The simulation system is provided with a manikin of a human body having a first side and a second side. The second side has a transparent simulated skin, an internal organ simulated model, and a sensor module configured to collect and transmit data based on an input by a user. In addition, the system has a processor with an implemented computer program configured to receive and interpret the data from the sensor module and provide a feedback to the user based on the interpretation of the data.

12 Claims, 5 Drawing Sheets

LYMPHATIC SYSTEM SIMULATOR

CROSS REFERENCE TO RELATED APPLICATIONS

This application claims priority of U.S. Provisional Application No. 63/534,198 filed on Aug. 23, 2023 under 35 U.S.C. § 119(e), the entire contents of all of which are hereby incorporated by reference.

BACKGROUND

The present invention generally relates to a system for teaching practical skills in the medical field. More specifically, the present invention relates to a simulation system for hands-on training for medical diagnostic and treatment techniques of professional medical staff and medical students with regard to various systems of the human body, for example, the lymphatic system.

The current quality crisis in health care is well recognized. Numerous recent studies have led to the conclusion that the burden of harm conveyed by the collective impact of all of our health care quality problems is staggering. The related figures are illustrative. Estimates of the number of deaths each year as a result of medical errors are larger than those who die from motor vehicle accidents, breast cancer, or AIDS. Health professionals are also concerned and report that the quality of care has been greatly reduced.

On the other hand, patients have been neglected due to the lack of treatment, causing an increase in the number of post-surgical visits and increasing longer hospital stays and higher payouts from insurance companies. Patients are experiencing deficits with the lack of education that has led to chronic cases that could have been prevented if, for example, "healthy" lymph nodes have been protected instead of destroyed with extensive incisions that could have been prevented during the treatment.

A solution is therefore needed that allows for hands-on training for medical diagnostic and treatment techniques of professional medical staff and medical students with regard to various systems of the human body, for example, lymphatic system. This system can be introduced to therapists, nursing schools, medical schools, hospitals, simulation labs, and educational programs that can be incorporated with the simulation device, which would provide an opportunity for students, professionals and family members to have the educational experience to take care of their own loved ones for a better quality of life at home with the proper training, direction, and feedback from the realism of the simulation device.

SUMMARY

According to a non-limiting embodiment of the present invention, a simulation system for hands-on training for medical diagnostic and treatment techniques is provided. The simulation system is provided with a manikin of a human body having a first side and a second side. The second side has a transparent simulated skin, an internal organ simulated model, and a sensor module configured to collect and transmit data based on an input by a user. In addition, the system has a processor with an implemented computer program configured to receive and interpret the data from the sensor module and provide a feedback to the user based on the interpretation of the data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
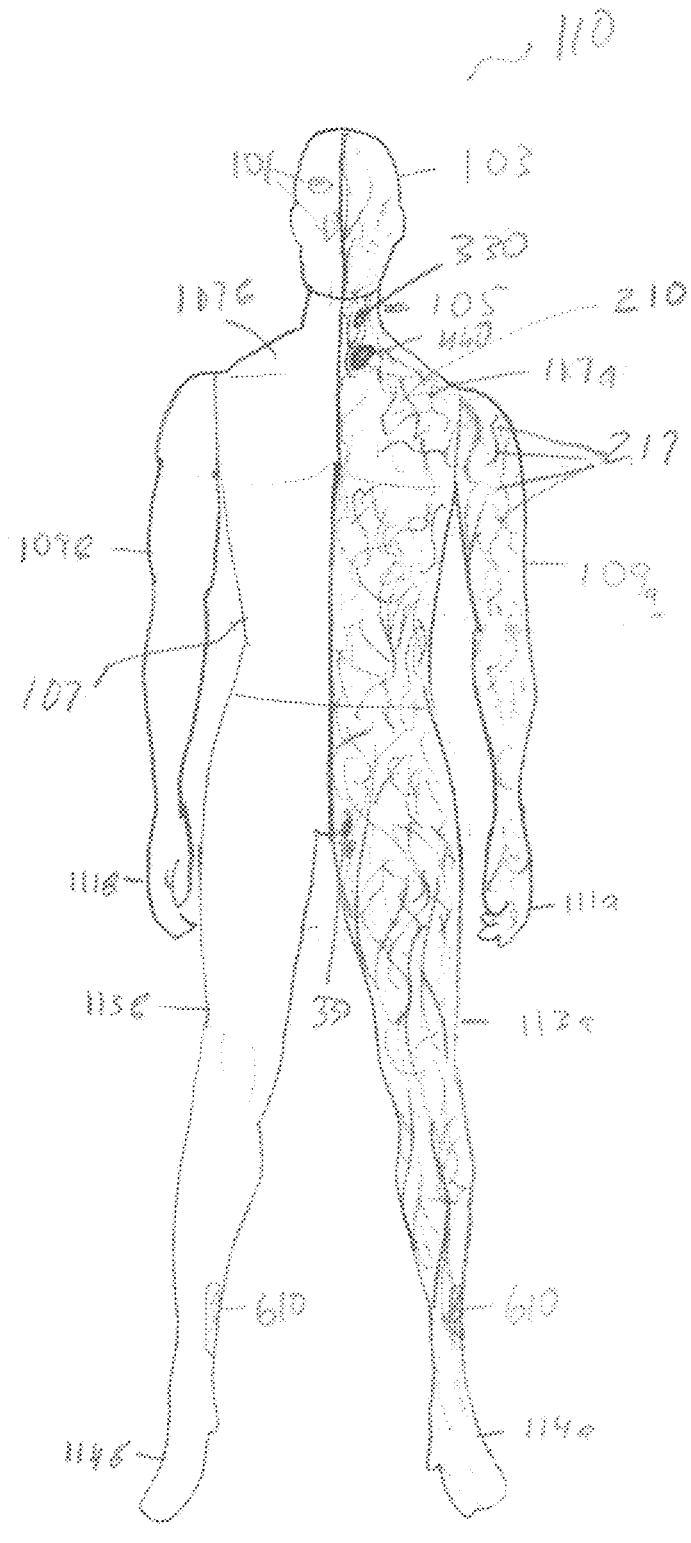
FIG. 1 depicts an exemplary diagram of a manikin of a simulation system for hands-on training for medical diagnostic and treatment techniques in accordance with embodiments of this invention.

In the accompanying figures and following detailed description of the described embodiments, the various elements illustrated in the figures are provided with two, three or four digit reference numbers. With minor exceptions, the leftmost digit(s) of each reference number correspond to the figure in which its element is first illustrated.

DETAILED DESCRIPTION

Reference to "a specific embodiment" or a similar expression in the specification means that specific features, structures, or characteristics described in the specific embodiments are included in at least one specific embodiment of the present invention. Hence, the wording "in a specific embodiment" or a similar expression in this specification does not necessarily refer to the same specific embodiment.

Hereinafter, various embodiments of the present invention will be described in more detail with reference to the accompanying drawings. Nevertheless, it should be understood that the present invention could be modified by those skilled in the art in accordance with the following description to achieve the excellent results of the present invention. Therefore, the following description shall be considered as a pervasive and explanatory description related to the present invention for those skilled in the art, not intended to limit the claims of the present invention.

Reference to "an embodiment," "a certain embodiment" or a similar expression in the specification means that related features, structures, or characteristics described in the embodiment are included in at least one embodiment of the present invention. Hence, the wording "in an embodiment," "in a certain embodiment" or a similar expression in this specification does not necessarily refer to the same specific embodiment.

Embodiments of the present invention are directed to a simulation device for hands-on training for medical diagnostic and treatment techniques of professional medical staff and medical students with regard to various systems of the human body, for example, lymphatic system. While most of the exemplary embodiments described herein relate to the simulation device for the lymphatic system, a person skilled in the art will readily ascertain the applicability of the present invention to other systems of the human body.

While it is desirable to train students in patient care protocols before allowing contact with real patients, the common textbooks lack the important benefit of hands-on practice. However, the hand-on training is both costly to attain and often prohibitive due to student's lack of experience. Hence, often hands-on training is only provided later in the education process. And, once the education is obtained it is even more difficult to re-tarin or obtain additional hands-on training.

Another problem in patient care education is that the patient simulators used for teaching a user are generally passive. For example, in a child birthing simulation, a user must position the simulated fetus in a simulated maternal pelvis, move it down the birth canal, birth the fetus's head, rotate the fetus, and finally, pull out the fetus. While replicating the sequence of events in a real delivery, the lack of verisimilitude resulting from physical manipulation of the fetus by the user undermines an appreciation for the difficulties of providing patient care. This is also true with other systems that simulate other human processes and system such as lymphatic system.

Hence, one of the aims of healthcare simulation is to establish a teaching environment that closely mimics key clinical cases in a reproducible manner. The present invention is directed to an interactive simulation system for teaching patient care techniques that expands the functionality of the patient simulators by increasing the realism of the look, feel, and functionality of the patient simulators that can be used to train medical personnel in a variety of clinical situations. According to embodiments of the present invention, is provided with a simulation device, such as a manikin of the human body that allows for moving fluids that can be penetrated by the user. More particularly, in case of the lymphatic system, the lymphatic fluids can be seen through movement, while such observation is not possible with a human body useless it is under different forms of micro-UV scanning.

The simulation device of the present invention can have many different components that serve patients with oncologic diagnosis and post-surgical procedures such as head and neck cancers, breast cancer with nodules that can be palpated and scar tissue at the breast that user will learn and practice how to reroute fluids or breakdown scar tissues to move the fluids, wounds that fill up with fluid needing to be excreted for wound healing. Other diagnoses can be incorporated in the device such as a total knee replacement for example on "how to" including lymphatic wrapping as one of many options for learning and simulation.

To enhance the educational experience of a user, embodiments of the present invention can have the device with compartments for fluid reservoirs to hold the fluid as it is moved to the lymph nodes of the manikin for proper training in six different areas of the body being used by many centrifugal pump systems. The device can also have interchangeable reproductive parts to teach and show the users testicular/prostate cancers, labia reconstruction, transgender reformations that result in major swelling and discomfort due to stagnation of lymphatic fluids. This can have expandable scrotums and labia's due to the point of the distal drainage and area of incision for post-surgical outcomes. The device further can provide weeping areas at the lower legs for excessive edema that must release, or the limbs will begin to open due to the pressure of the fluids and this too often causes great wounds due to the acid from the fluid that have not been wrapped or pushed to lymph nodes for pain and pressure relief.

The simulation device can include changing pupils that dilate and tear with pressures and showing when proteins are extremely high in a human body from edema in cancers. The eyes can show a cloudy or clear pupil showing that the proteins are higher than normal as observation of assessment. This can show swelling referred to as "Trismus." The nail beds of the hands and feet will have an area or assessment for blood flow and pulses checking for decrease pressures and blood flow to the distal areas.

According to embodiments of the present invention, the simulation device can have the ability to reflect that vibration that can move fluids in the body for EBR that can be published for opportunities that can show users ways to improve with decreasing incisions for less scar tissue.

Further, according to embodiments of the present invention, one side of the device can be transparent for the visualization of, for example, of the lymphatic system itself. The other side can be the opaque that can mimic human skin for realism and sensors, fluid bags, pulses, nodules, nasal and eye tearing, scar tissue, barrier dams for rerouting fluids around the scar tissue if the feedback does not allow for the fluid to flow through it must find a different direction for relief. The device can have layers for realism and diversity an example of a chest/breast before the procedure, the next layer can be the mastectomy with scar tissue and barriers that have to worked to be broken down or rerouted to excrete the fluid to move to lymph nodes being the post-surgical.

Another module of the simulation device can be a mobile device for interacting with the manikin, receive feedback based on sensors on top of the fluid bags for the correct amount of pressure that is instructed to apply. The forgoing and other embodiments of the simulation device will be described below and illustrated by FIGS. 1-5.

FIG. 1 illustrates an exemplary embodiment of a system 100 for hands-on learning of medical diagnostic and treatment techniques that is provided with a manikin 110. According to embodiment of the present invention, the manikin 110 is in the form of a human body. As shown in FIG. 1, the manikin 110 can include a simulated head 103, a simulated neck 105, a simulated torso 107, simulated arms 109a and 109b, simulated hands 111a and 111b, simulated legs 113a and 113b, simulated feet 114a and 114b, and simulated skin 117a,b. The simulated neck 105 is connected to the simulated torso 107. The simulated head 103 is connected to the simulated neck 105. The simulated arms 109a and 109b are connected to the simulated torso 107. The respective simulated hands 111a and 111b are connected to the simulated arms 109a and 109b. The simulated legs 113a and 113b are connected to the simulated torso 107. The respective simulated feet 114a and 114b are connected to the simulated legs 113a and 113b. The simulated skin 117a,b may be part of the simulated head 103, the simulated neck 105, the simulated torso 107, the simulated arms 109a and 109b, the simulated hands 111a and 111b, the simulated legs 113a and 113b, the simulated feet 115a and 115b, and/or any combination thereof. According to embodiments of the present invention, the simulated skin 117a is transparent providing visibility to the internal human system, for example lymphatic system, while simulates skin 117b is opaque to simulate most closely the color and texture of human skin.

The second side of the manikin 110, which is covered with the simulated skin 117b, can be provided with layers of simulated scar tissue, sensors, fluid bags and pumps described below. Additionally, the second side of the manikin 110, in the head region 103, can provide simulation eye and nasal tearing 101. For example, simulated pupils (not shown) can dilate and tear with pressures and show when proteins are extremely high in a human body from edema in cancers. Simulated eyes can show a cloudy or clear pupil showing that the proteins are higher than normal as observation of assessment.

Figure 2:
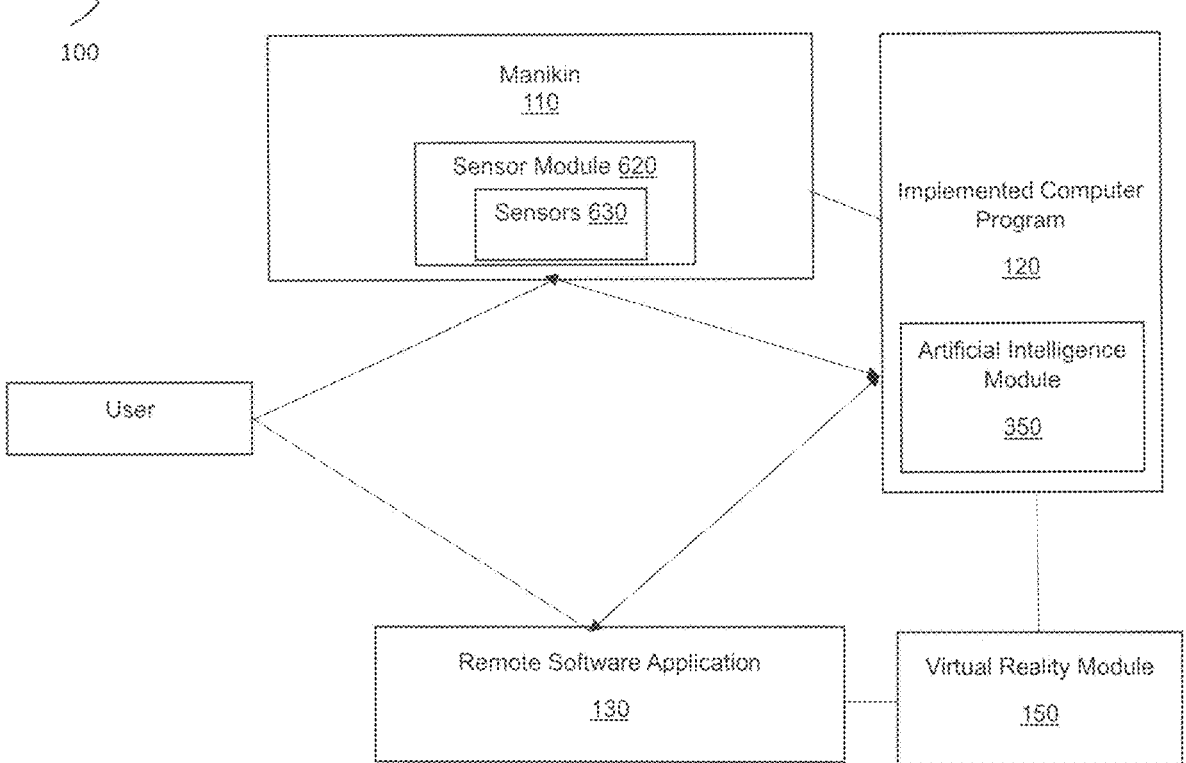
FIG. 2 depicts a diagram of the simulation system for hands-on training for medical diagnostic and treatment techniques in accordance with embodiments of this invention.

FIG. 2 illustrates exemplary embodiments of the present invention that can be provided with an implemented computer program 120 that can operate one or more modules remotely via cloud computing services accessible via network connection. That is, the manikin 110 can be connected over a network to one or more servers (not shown). The implemented computer program 120 can also include a processor and memory for executing and storing instructions, a software with one or more applications and an operating system, and a hardware with a processor, memory and/or graphical user interface display.

According to embodiment of the present invention, the implemented computer program 120 can be connected to a remote software application 130 which can enable and direct the simulation features of the simulation device 100. The remote software application 130 can be provided with a user interface (not shown) to facilitate user interaction. The remote software application 130 can be implemented on a personal computer with a keypad and mouse for input, mobile device (e.g., a mobile phone or tablet), workstation, embedded system or any other computer system.

According to embodiment of the present invention, as shown in FIG. 1, the manikin 110 can include a simulated lymphatic system 210. The implemented computer program 120 can be electronically in communication with the simulated lymphatic system 210, e.g., via Bluetooth®. In other words, the implemented computer program 120 can be configured to monitor and/or control the simulated lymphatic system 210.

The simulated skin 117a can be made from a transparent and flexible material, for example EcoFlex 0031. The clearness of the material allows the user to visualize the fluids of the simulated lymphatic system 210 being moved once the pressure on the simulated skin 117a is applied.

Figure 3:
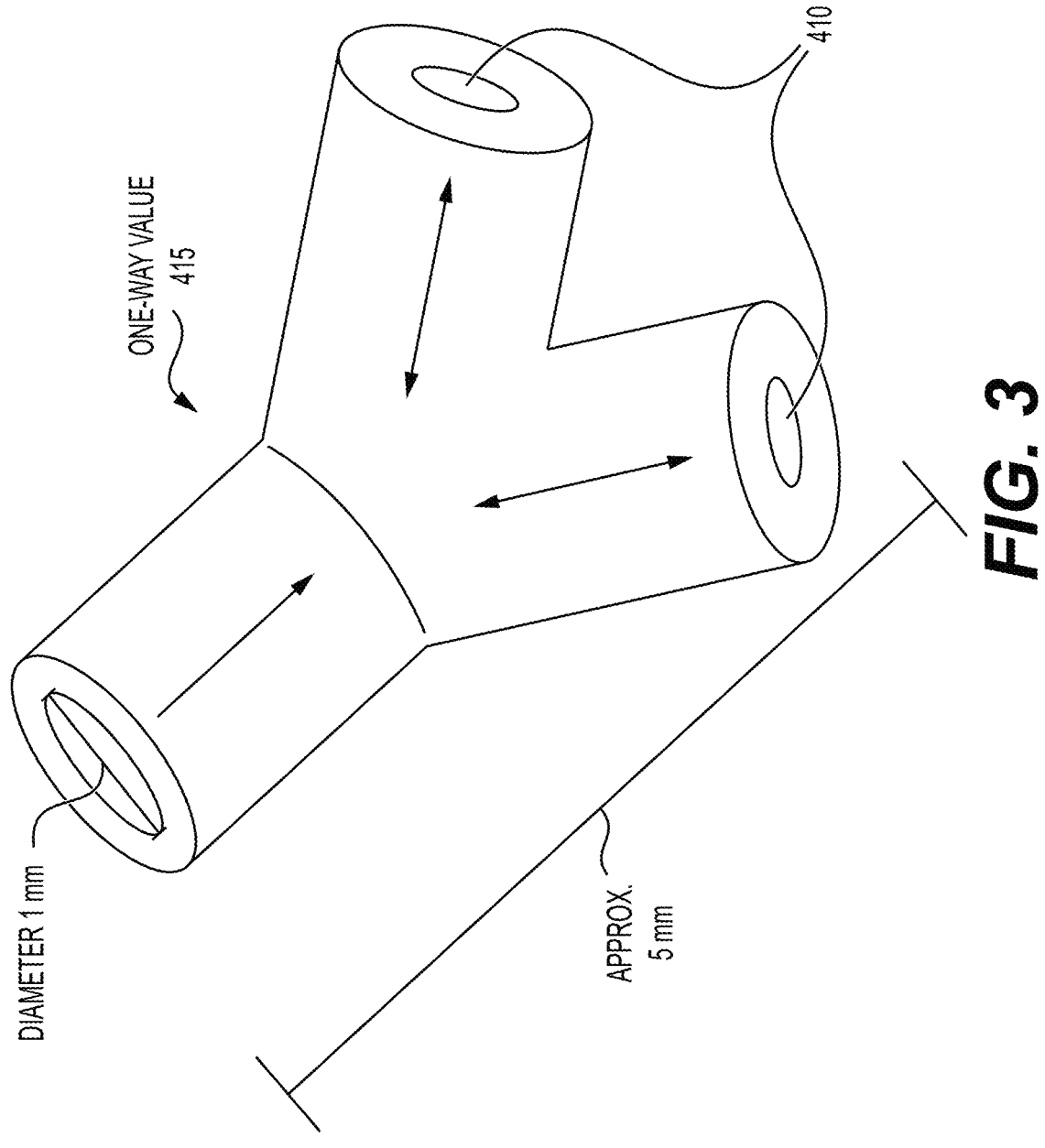
FIG. 3 depicts a diagram of a one-way valve in accordance with embodiments of this invention.

The simulated lymphatic system 210 is provided with simulated lymph vessels 217. The simulated lymph vessels 217 can be made of numerous microtubes to simulate simulated lymphatic system 210. To provide a more realistic experience for the user, the simulated lymphatic system 210 can be provided with manifolds and tube connectors, shown in FIGS. 3 and 4, that allow the simulated lymph vessels 217 to converge and diverge at the appropriate areas in the manikin 110. For example, in the lower simulated arm 109a there are a number of Y-shaped connectors 310 about 5 mm long and about 5 mm wide (as shown in FIG. 3). The connectors 310 can be made from a clear resin to allow the user to observe the simulated lymphatic fluid 410 traveling from one vessel to the other.

To simulate lymph nodes, many simulated lymph vessels 217 need to be merged into the connectors. To create simulated lymph nodes 330, the simulated lymphatic system 210 can be provided with the simulated lymph nodes 330 that is connectors that merge between 8 and 10 simulated lymph vessels 217. To provide for the most realistic experience for the user, the lymph nodes 330 will be concentrated in the axilla, pelvis and neck areas of the manikin 110.

As shown in FIG. 3, according to embodiments of the present invention, the stimulate simulated lymphatic system 210 can be provided with one-way valves 415. The one-way valves 415 allow manual lymphatic drainage to be performed on the manikin 110. Without the use of the one-way valve 415 any fluid drained during MLD would flow back into the section of the body where it was originally. By including the one-way 415, the back flow can be avoided. The arrows illustrate the movement of a simulated lymphatic fluid 410.

Figure 4:
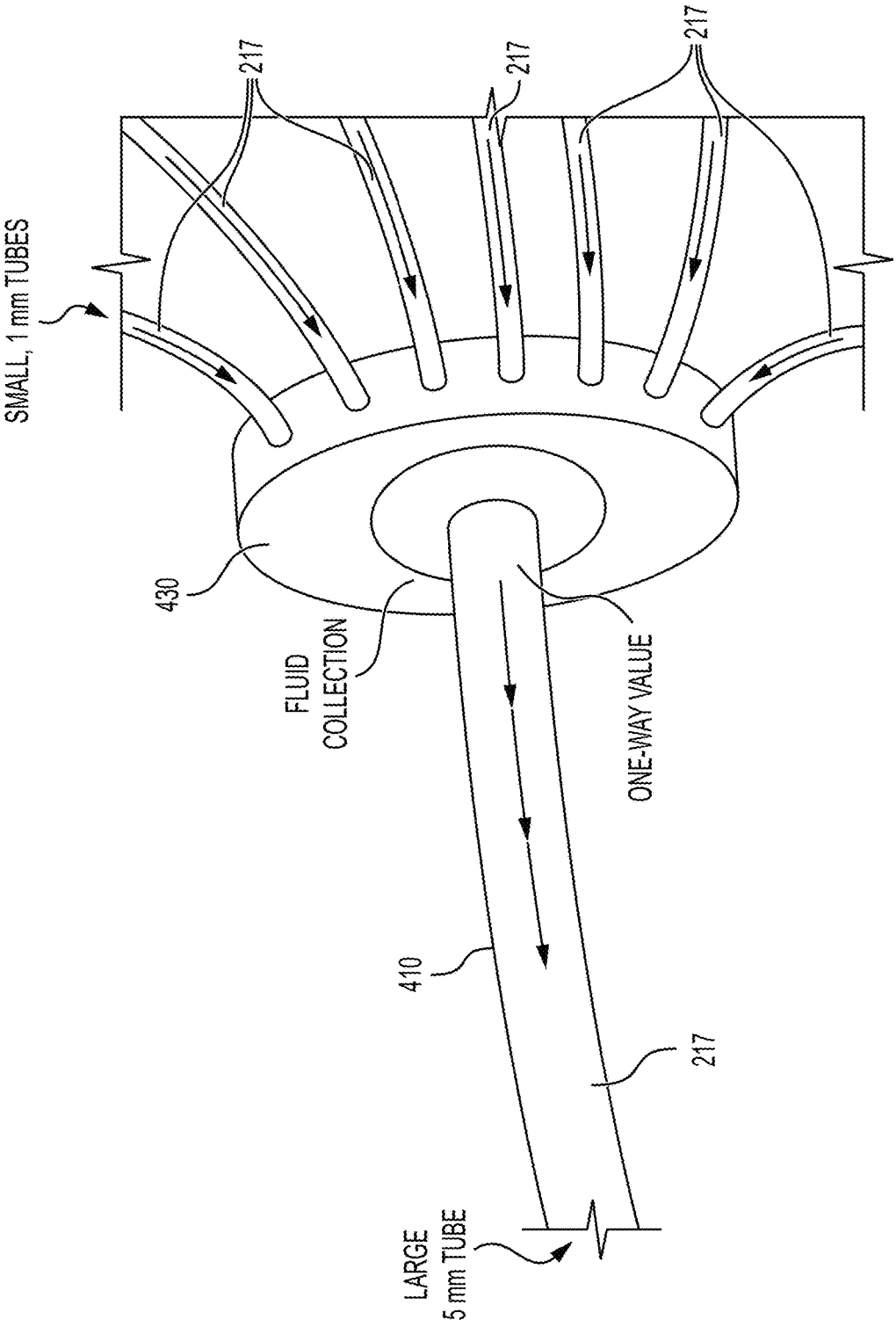
FIG. 4 depicts a diagram of the movement of a simulate lymphatic fluid in accordance with embodiments of this invention.

FIG. 4 illustrates the movement of the simulated lymphatic fluid 410 through the simulated lymphatic system 210 when the user applies pressure on the manikin 110. The configuration illustrated in FIG. 4 according to embodiments of the present invention shows a plurality of the simulated lymph vessels 217 of different size provided with the one-way valve 415. A plurality of smaller simulated lymph vessels 217, for example 1 mm or less, would converge within a manifold 430. Once the simulated lymphatic fluid 410 is pushed towards the manifold 430 by the user, it will collect in the manifold 430 and subsequently exit through a larger simulated lymph vessel 217. The simulated lymphatic fluid 410 will have lower velocity in the "exit" simulated lymph vessel 217 due to its larger size than in the smaller simulated lymph vessels 217. The entrance and exit velocities of the simulated fluid 410 will also depend on the amount of force the user applied to the manikin 110. Additionally, if the force is applied over a larger area, a larger amount of the simulated fluid will be displaced from that region of the manikin 110, thereby building the pressure in the manifold 430 and the simulated lymph vessels 217. When the user applies force to more than one simulated lymph vessels 217 simultaneously, the simulated fluid may enter the manifold 430 from different directions. FIG. 4 illustrates via arrows the movements of the simulated fluid 410.

As illustrated in FIG. 1, to more closely mimic the human lymphatic system, the simulated lymph vessels 217 are configured such that the upper right corner lymph will be configured to drain in the right lymphatic duct and the rest of the lymph will drain into a thoracic duct 440.

Figure 5:
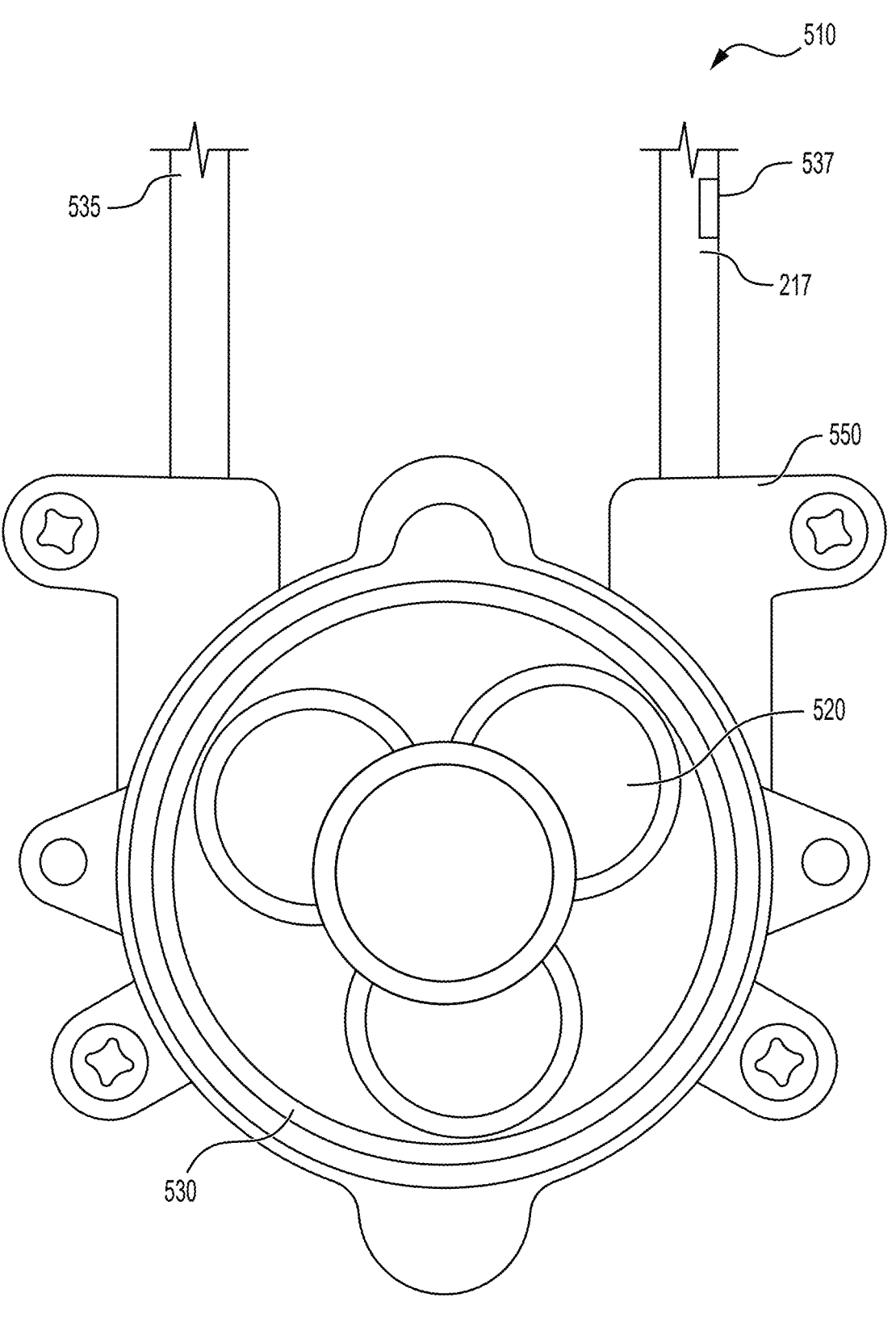
FIG. 5 depicts a diagram of a pump in accordance with embodiments of this invention.

The manikin 110 can be provided with a pump 510 shown in FIG. 5. The pump 510 can be a low fidelity pump to move the simulated fluid 410. The pump 510 can be provided with rollers 520, a pump hose 530, and a pump housing 550. The hose 530 can be provided with a suction side 535 and discharge side 537. The rollers 520 when activated by a motor (not shown), will push the rollers 520 at the simulated lymph vessels 217 thereby pushing the liquid through. The pump 510 can be controlled via the remote software application 130. The remote software application 130 can communicate with the pump 510 via WiFi or Bluetooth®. Preferably, the manikin 110 can be provided with six to eight pumps 510. When setting a flow rate for the pump 510, the following can be considered: stages of edema fluid for the consistency for thicker or thinner simulation fluid 410, fluid viscosity and density, tubing (the simulated lymph vessels 217) sizes and materials, pump head design and speed, pressure and flow rate requirements, and accuracy and precision needed for a specific simulation.

To store and provide drainage for simulated fluid 410, the manikin 110 can be also provided with multiple fluid bags 610 (shown in FIG. 1).

Additionally, the fluid bags 610 can be provided with cut-off valves (not shown) to separate the flow of the simulated fluid 410 to the area that the user is working such as the upper extremity or lower extremity. The cut-off valves can be controlled via the remote software application and/or manually.

The manikin 110, according to embodiments of the present invention, can be provided with a sensor module 620, as shown in FIG. 2. The sensor module 620 can have a plurality of sensors 630. The sensors 630 can be located under the fluid bags 610, which are in turn can be provided in the arm 109*a*, 109*b*, the hand 111*a*, 111*b*, the head 103, facial areas and the like. According to embodiments of the present invention, a multiple of sensors 630 can be located in the areas around the manifolds 430. The facial areas of the head 103 can have four to six sensors 630 for finer touch and output of pressures with a resolution.

The sensors 630 communicate with the implemented computer program 120 to process and display via the remote software application 130 the pressures and the movement of the simulated fluid 410 and/or increased and regulate volume of the simulated fluid 410 as it enters and exist the manifolds 430.

The sensor module 620 can use to determine pressure a HiLetgo HC-D5 Wireless Bluetooth RF Transceiver Master Slave Integrated Bluetooth Module 6 pin Serial port Communication BT Module for Ardunio and/or Zetlinig Thim Film Pressure Sensor, Pressure pad-Force Sensing Resistor RP-540-High Accuracy Force Sensor for Intelligent High-end Seat.

The sensors 630 can be provided in sectioned areas of the manikin 110 to register the pressures of the user's hands and provide feedback to the user via the remote software application 130 to apply correct pressures or to attempt with lighter or heavier touch to accomplish the necessary task.

Additionally, the manikin 110 can be provided with flow sensors to measure the fluid flow rate, detecting any changes or anomalies. This can assist in maintaining a consistent flow rate and ensuring accurate the simulated fluid 410 delivery to a specific area of the manikin 110. The level sensors 630 can be used to detect the fluid levels in the manifold 430 or the fluid bag 610, triggering the pump 510 to turn on or off as needed to maintain the desired level of the simulated fluid 410. The temperature sensors 630 can monitor the simulated fluid 410 temperature, which is essential in applications like medical or laboratory settings where temperature control is critical. The conductivity sensors 630 measure the simulated fluid 410 conductivity, detecting changes in the composition and concentration.

According to the embodiments of the present invention, the sensor module 620 is integrated with the pump 510 and enables real time monitoring and adjustment of flow rates, pressure, and temperature of the simulated fluid 410, an automatic shut-off or alarm triggering functions in case of anomalies or errors, and a precise fluid delivery and monitoring in application like medical infusion, laboratory testing, or industrial processing. In other words, by combining sensor module 620 and the pump 510, embodiments of the present inventio achieve enhanced precision, safety, and reliability in simulation fluid 410 handling applications.

According to embodiment of the present invention, the implemented computer program 120 can also have an artificial intelligence (AI) module 350. AI module 350 allows the implemented computer program 120 to determine based on an input data whether the user's interaction with the manikin 110 conforms with the proper predetermined parameters, and provide a feedback via, for example, the remote software application 130. The AI module 350 can be used to determine predictive calculations of possible outcomes of the simulated medical procedures carried out by the user via the system 100.

A medical supervision interface module (not shown) can be used for continuous AI training. The medical supervision interface module preferably is trained by a specially dedicated team that are qualification in the field of analysis in the health care fields in order to be able to properly evaluate the predictions of the AI module 350.

According to embodiments of the invention, the system 100 can also include a virtual reality (VR) module 150. The VR module 150 can be realized by the mobile device containing the remote software application 130 or, alternatively, a separate VR device, for example, VR headsets offered by manufactures like Samsung, Oculus, Hewlett Packard and the like. The VR device for example, can include one or more speakers, microphones, and/or headphones. A VR environment may be displayed on the display to provide a computer simulation of real-world elements. Such an immersive VR environment can aid and improve the user's interactions with the manikin 110. In particular, the VR environment can aid the user in demonstrating how to properly perform the specific medical procedure, aid in visualizing the movement of the simulated fluid 410 and the like. The VR component can be used for individual or group training sessions.

Additionally, the computer implement program 120 can generate a feedback to the user based on the user's performance of the simulated procedure. The feedback can be delivered via the remote software application 130. The feedback can indicate whether the user is following the proper or assigned procedure when performing the simulated procedure, indicate which mistakes are made and how the mistakes can be corrected. The correction path can be visualized via the VR device or otherwise communicated via the remote software application 130. The feedback can be the form of text, voice, animation or combination of various techniques known in the art the form of text, voice, animation or combination of various techniques known in the art.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possibly equivalent variations and equivalent arrangements.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A simulator system for hands-on training for medical diagnostic and treatment techniques, the system comprising:

a manikin of a human body having a first side and a second side, the second side comprising:

a transparent simulated skin, a simulated lymphatic system, wherein the simulated lymphatic system comprises a plurality of simulated vessels, a plurality of simulated lymph nodes, a plurality of valves configured to drain a simulated lymphatic fluid, a plurality of manifolds to facilitate collection and movement of the simulated lymphatic fluid; and a sensor module being disposed throughout the manikin and configured to collect and transmit data based on an input by a user; and a processor with an implemented computer program configured to receive and interpret the data from the sensor module and provide a feedback to the user based on the interpretation of the data, wherein a user-applied pressure or a movement causes a corresponding displacement, accumulation, or flow of the simulated lymphatic fluid within the simulated lymphatic system, wherein the corresponding displacement, accumulation, or flow is visually observable through the transparent simulated skin, and wherein the feedback is based at least in part on a relationship between the detected user-applied pressure or movement and/or the resulting visually observable simulated lymphatic fluid behavior.

2. The system according to claim 1, wherein the simulated lymph vessels have different diameters.

3. The system according to claim 1, wherein the manikin further comprises a pump and a fluid bag.

4. The system according to claim 3, wherein the pump comprises:

a housing to prevent the simulate lymphatic fluid entering the pump;

a plurality of rollers; and a hose having a suction side and a discharge side.

5. The system according to claim 4, wherein the manikin comprises a plurality of pumps.

6. The system according to claim 1, wherein the sensor module comprises a flow sensor, a level sensor, a temperature sensor and a conductivity sensor.

7. The system according to claim 1, wherein the sensor module configured to communicate with the implemented computer program.

8. The system according to claim 6, wherein the sensor module is integrated with the pump and configured to monitor and adjust in real time a flow rate, pressure, and temperature of the simulated lymphatic fluid.

9. The system according to claim 1, wherein the implemented computer program comprises an artificial intelligence (AI) module, wherein the AI module is configured to determine based on an input data whether the user's interaction with the manikin conforms with predetermined parameters.

10. The system according to claim 1, wherein the feedback is displayed as a text, a voice, and/or an animation on a user device.

11. The system according to claim 1, further comprising a virtual reality (VR) module.

12. The system according to claim 11, wherein the VR module comprises VR headsets configured to display a computer simulation of elements of a lymphatic system.

* * * * *